United States Patent [19]
Inokuchi et al.

[11] Patent Number: 5,600,616
[45] Date of Patent: Feb. 4, 1997

[54] OPTICAL INFORMATION RECORDING AND REPRODUCING APPARATUS WITH VARIABLE REPRODUCTION SIGNAL PROCESSING FOR INFORMATION RECONSTRUCTION AND RECORDING MEDIUM WITH ITS REPRODUCTION CONDITION

[75] Inventors: Chikashi Inokuchi, Katano; Kenzou Ishibashi, Moriguchi; Mayumi Hironaka, Katano, all of Japan

[73] Assignee: Matsushita Electric Industrial Co., Ltd., Osaka, Japan

[21] Appl. No.: 224,099

[22] Filed: Apr. 6, 1994

Related U.S. Application Data

[63] Continuation of Ser. No. 913,869, Jul. 15, 1992, abandoned.

[30] Foreign Application Priority Data

Jul. 15, 1991 [JP] Japan ..................................... 3-173699

[51] Int. Cl.⁶ ...................................................... G11B 7/00
[52] U.S. Cl. .................................. 369/48; 369/54; 369/124
[58] Field of Search ............................ 369/54, 58, 44.32, 369/44.35, 44.36, 48, 47, 49, 44.27, 124; 360/27, 25, 53, 78.07, 46, 65; 371/11.2

[56] References Cited

U.S. PATENT DOCUMENTS

| | | | |
|---|---|---|---|
| 4,908,811 | 3/1990 | Yokogawa et al. | 369/54 |
| 5,057,946 | 10/1991 | Sugiyama | 360/46 |
| 5,065,386 | 11/1991 | Takeya et al. | 369/44.32 |
| 5,124,967 | 6/1992 | Isaka et al. | 369/48 |
| 5,136,569 | 8/1992 | Fennema et al. | 369/54 X |
| 5,299,070 | 3/1994 | Takahashi et al. | 360/61 X |

FOREIGN PATENT DOCUMENTS

| | | |
|---|---|---|
| 0361944 | 4/1990 | European Pat. Off. . |
| 0387813 | 9/1990 | European Pat. Off. . |
| 0473417 | 3/1992 | European Pat. Off. . |
| 6419565 | 1/1989 | Japan . |
| 1107377 | 4/1989 | Japan . |
| 2128325 | 5/1990 | Japan . |
| 4-30331 | 2/1992 | Japan . |
| 2226688 | 7/1990 | United Kingdom . |

OTHER PUBLICATIONS

Patent Abstracts of Japan, vol. 13, No. 294, Mar. 17, 1989 JP 01-073564.
Patent Abstracts of Japan, vol. 8, No. 113, Feb. 4, 1984 JP 59-022207.

*Primary Examiner*—W. R. Young
*Attorney, Agent, or Firm*—Ratner & Prestia

[57] ABSTRACT

An optical information recording and reproducing apparatus comprising: a reproduction signal processing circuit including one or more elements which have respective variable parameters for changing states of the elements, respectively at the time of read-out of data from a recording medium such that the data is read out from the recording medium by changing the states of the elements.

10 Claims, 10 Drawing Sheets

OPTICAL INFORMATION RECORDING AND REPRODUCING APPARATUS WITH VARIABLE REPRODUCTION SIGNAL PROCESSING FOR INFORMATION RECONSTRUCTION AND RECORDING MEDIUM WITH ITS REPRODUCTION CONDITION

This application is a continuation of application Ser. No. 07/913,869 filed Jul. 15, 1992, now abandoned.

BACKGROUND OF THE INVENTION

The present invention generally relates to an optical information recording and reproducing apparatus for recording and reproducing information on an optical disk having optically detectable guide tracks and more particularly, to an optical information recording and reproducing apparatus in which a processing for recovering data errors at the time of reproduction of signals recorded on the optical disk is performed.

In optical disks having enormous potentialities as a memory having high density and large capacity, error control (error detection and correction) technique is vital in order to overcome error rate higher than those of magnetic recording apparatuses. Generally, optically detectable guide tracks such as guide grooves are provided in the optical disks so as to raise guide track density. A laser beam condensed to a diameter of about 1 μm is irradiated over a recording layer formed on the guide track such that information signals are recorded on the recording layer by perforation, deformation of shape of the guide pit, change of optical reflectance of the recording layer, magnetooptical recording, etc.

Since recording pits and track pitch are formed on the order of microns, the optical disks are apt to incur various defects, dust and damage during their production processes or in environment for their use, thereby resulting in drop-out of reproduction signals. As a result, it is said that raw error rate of the optical disks ranges from $10^{-4}$ to $10^{-6}$ which is quite higher than that of $10^{-9}$ to $10^{-12}$ obtained in magnetic disks representative of known recording mediums.

Therefore, optical information recording and reproducing apparatuses employing optical disks have powerful error control and a verification function that immediately after data has been recorded at a track, contents recorded at the track are reproduced such that it is verified whether the data has been recorded at the track correctly. By using this verification function, verification is performed at the time of recording of the data. If it is found that the data is recorded at a defective sector referred to above and thus, contents of the data cannot be guaranteed, the data is rerecorded at an alternative sector provided at another location preliminarily.

Furthermore, in information recording and reproducing apparatuses including the optical information recording and reproducing apparatuses, in case an error has been detected at the time of read-out of the data, rereading of the target data is generally attempted as a error recovery processing.

Figure 5:
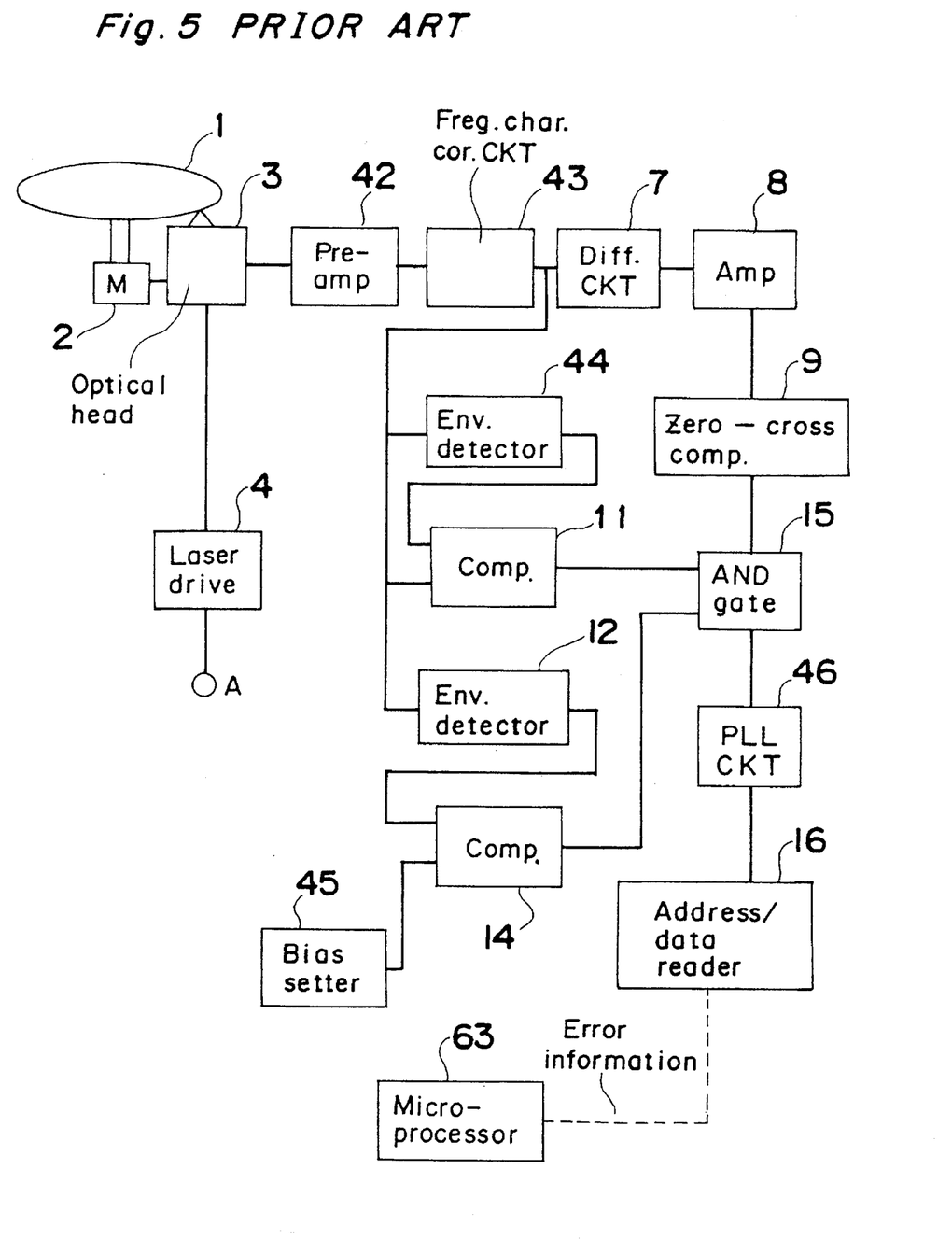
FIG. 5 is a block diagram showing a reproduction signal processing circuit employed in a prior art information recording and reproducing apparatus (already referred to)

With reference to FIG. 5 showing a reproduction signal processing circuit in the known information recording and reproducing apparatus, one example of an error recovery processing performed in the case where an error has been detected at the time of read-out of the data in the known information recording and reproducing apparatus is described. In FIG. 5, the prior art reproduction signal processing circuit includes an optical disk 1, a motor 2 for rotating the optical disk 1, an optical head 3 which condenses to a light beam having a diameter of about 1 μm, a laser beam emitted from a semiconductor laser or the like so as to irradiate the light beam over the optical disk 1 and a laser drive circuit 4 for modulating and driving the semiconductor laser, etc. in response to a recording information signal inputted to a terminal A. The known reproduction signal processing circuit further includes a pre-amplifier 42 for amplifying weak signals from the optical disk 1, a frequency characteristics correcting circuit 43 for emphasizing a specific frequency so as to facilitate reading of the data, a differentiating circuit 7, an amplifier 8, a zero-cross comparator 9, an AND gate 15, a phase locked loop (PLL) circuit 46, an address/data reading circuit 16 and a microprocessor 63 for controlling recording signals and reproduction signals or controlling the known information recording and reproducing apparatus as a whole. In addition, the known reproduction signal processing circuit includes first and second envelope detecting circuits 44 and 12 for detecting an envelope of a signal, first and second comparators 11 and 14 and a bias setting circuit 45 for setting a bias of the second comparator 14.

Figure 7:
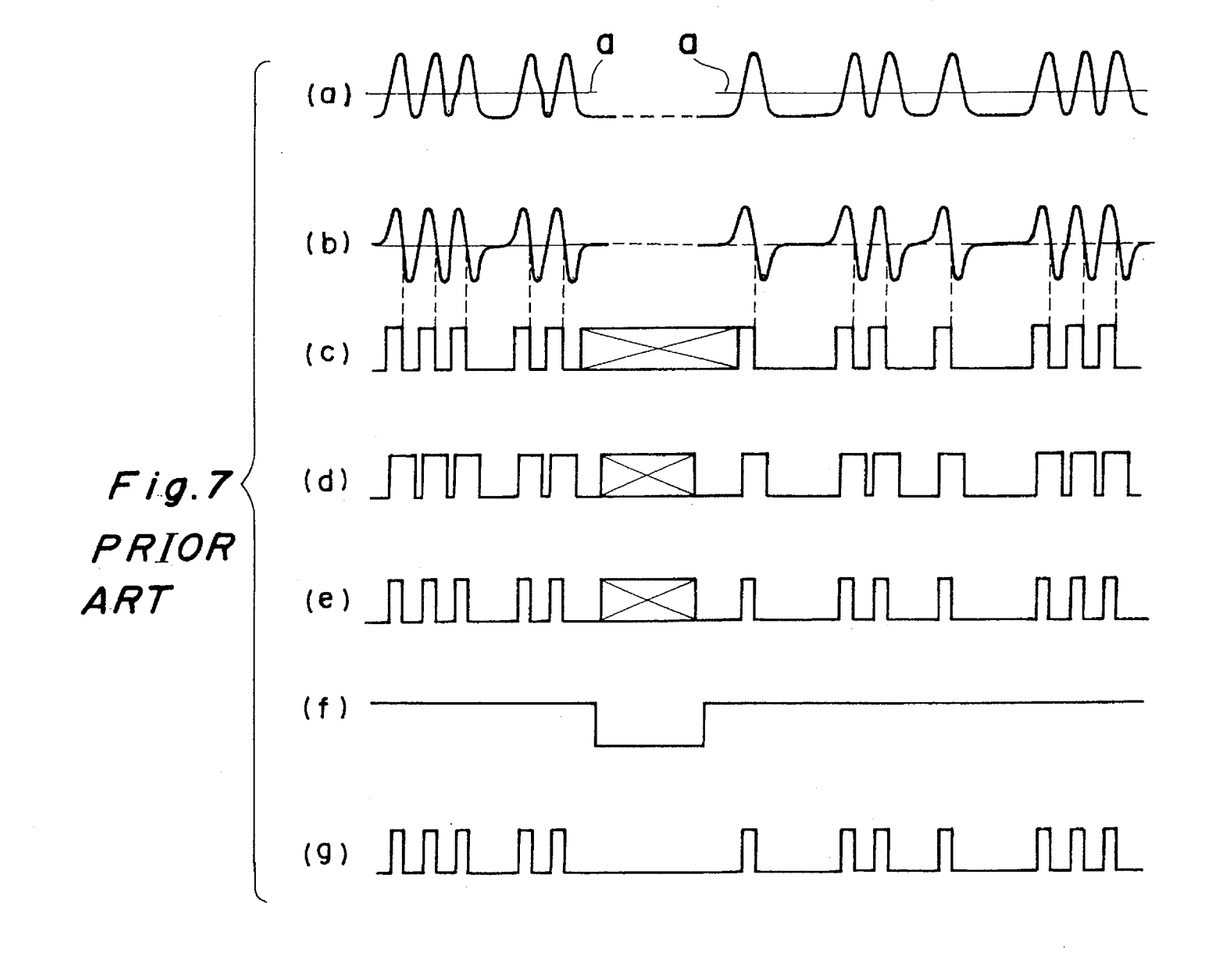

Operation of the prior art reproduction signal processing circuit of the above described arrangement is described briefly, hereinbelow. A reproduction signal read by the optical head 3 is amplified by the pre-amplifier 42. Frequency characteristics of the reproduction signal amplified by the pre-amplifier 42 are corrected by the frequency characteristics correcting circuit 43. FIG. 7(a) shows one example of an output signal of the frequency characteristics correcting circuit 43. Peak detection of the reproduction signal is performed by two circuitries. One of the circuitries is a system for detecting peak of the reproduction signal and is constituted by the differentiating circuit 7, the amplifier 8 and the zero-cross comparator 9. An output signal of the differentiating circuit 7 is shown in FIG. 7(b), while an output signal of the zero-cross comparator 9 is shown in FIG. 7(c) such that data is carried at a rise edge of the output signal of the zero-cross comparator 9. A crossed portion in FIG. 7(c) represents a noise signal.

The other of the circuitry is a data gate detecting system for eliminating the noise signal referred to above and is constituted by the first envelope detecting circuit 44 and the first comparator 11. As indicated by the portion a in FIG. 7(a), an output signal of the first envelope detecting circuit 44 is usually set such that about 40% of amplitude of the input signal is clipped. Thus, an output signal of the first comparator 11 is obtained as shown in FIG. 7(d) and peak of the data is detected by logical product of FIGS. 7(c) and 7(d) as shown in FIG. 7(e).

Furthermore, output of the data is performed by a gate signal of a data detecting circuit for detecting presence and absence of the data such that the data is outputted to only a sector which is regarded as recording the data therein. The data detecting circuit is formed by the second envelope detecting circuit 12, the bias setting circuit 45 and the second comparator 14. An output of the second comparator 14 is obtained as shown in FIG. 7(f) and finally, an output of the AND gate 15 is obtained as the reproduction signal as shown in FIG. 7(g). In case this binary signal is read by the address/data reading circuit 16 and any error is detected by the address/data reading circuit 16 during or after reading of the data, the address/data reading circuit 16 feeds error information back to the microprocessor 63.

Figure 6:
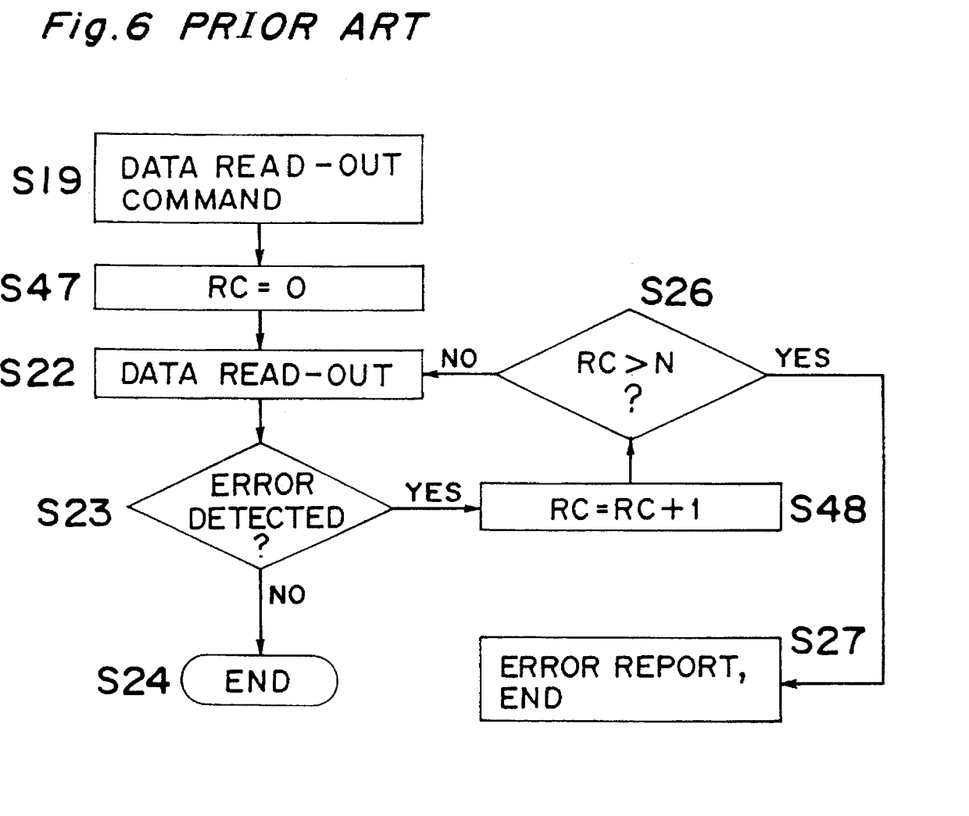
FIG. 6 is a flow chart showing processing of the prior art information recording and reproducing apparatus of FIG. 5 (already referred to)

FIG. 6 is a flow chart showing processing at the time of read-out of the data in the known information recording and reproducing apparatus. In case the data can be correctly read by a single read-out, the program flow proceeds in the sequence of steps S19, step S47, step S22, step S23 and step S24. At step S19, a data read-out command is received, while at step S47, a retry counter RC is initialized. At step S22, the data is read out, while at step S23, it is judged whether or not an error has been detected. Finally, the program flow ends at step S24.

Meanwhile, in case the data is read by several read-outs, the program flow proceeds in the sequence of steps S19, S47, S22, S23, S48, S26, S22, S23, S48, S26, ---, S48, S26, S22, S23 and S24. At step S48, an increment is imparted to count of the retry counter RC. At step S26, it is judged whether or not the count of the retry counter RC has exceeded a retry number N.

Figure 8:
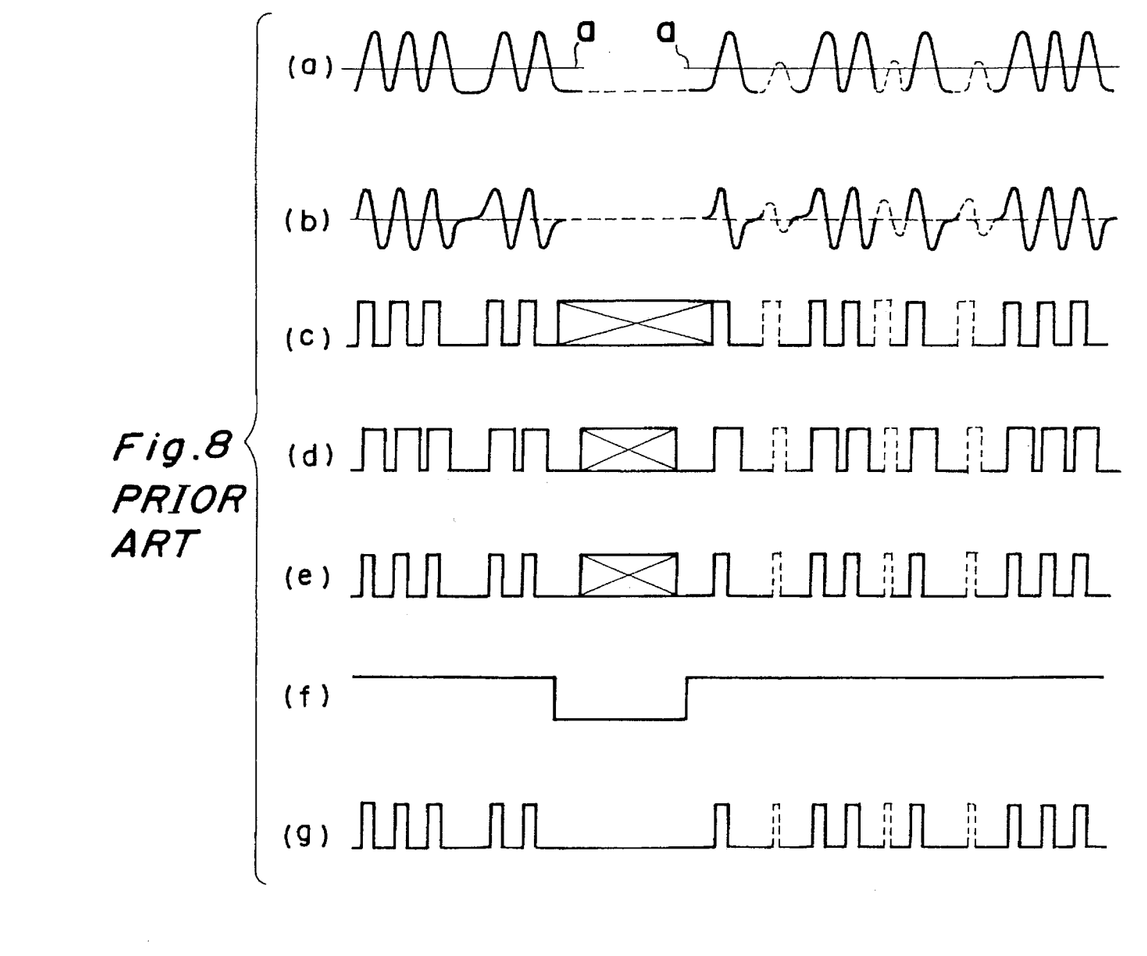

In the known information recording and reproducing apparatus, if the remainder of previously recorded signals (referred to as "unerased signals", hereinbelow) as shown by the broken line in FIG. 8(a) is caused to overlap a new signal to which the data is updated in the same sector, such a phenomenon may happen that even if the data can be correctly read by verification of one optical disk drive, an error is produced in each read-out in another optical disk drive due to scatter in production quality such as scatter of the light beam produced by the optical system and the semiconductor laser, etc. as described briefly, hereinbelow. FIG. 8(a) shows an output signal of the frequency characteristics correcting circuit 43 of FIG. 5. Character a in FIG. 8(a) shows an output signal of the first envelope detecting circuit 44, while FIG. 8(d) shows a gate signal for detecting peak. FIG. 8(b) shows an output signal of the differentiating circuit 7, while FIG. 8(c) shows an output signal of the zero-cross comparator 9. Accordingly, peak of the data is detected by logical product of FIGS. 8(c) and 8(d) and thus, a portion of the unerased signals is detected erroneously as shown in FIG. 8(e). A gate signal for detecting presence and absence of the data is shown in FIG. 8(f), while an output signal of the AND gate 15 also has a portion of the unerased signals as shown in FIG. 8(g). In this case, a data error is produced.

In case the data error is produced even if rereading is performed many times, the routine of steps S22, S23, S48 and S26 is repeated a predetermined reading number of N times after the processing of steps S19 and S47 and then, step S27 follows. As described above, such a case may take place that data in a sector having, e.g., many unerased signals is correctly read by verification of one optical disk drive but is detected by another optical disk drive as containing a data error.

SUMMARY OF THE INVENTION

Accordingly, an essential object of the present invention is to provide, with a view to eliminating the disadvantages inherent in conventional information recording and reproducing apparatuses, an optical information recording and reproducing apparatus in which in case a data error is detected during or after reading of data, the data is read a plurality of times by changing a plurality of variable parameters of a reproduction signal processing circuit so as to raise reliability of the recorded data.

In order to accomplish this object of the present invention, an optical information recording and reproducing apparatus according to the present invention comprises a reproduction signal processing circuit including one or more elements having respective variable parameters such that a microprocessor acting as a detection means for detecting a data error can set the parameters by utilizing an output from an analog switch or a digital-analog converter. Meanwhile, when a data error is detected during read-out of the data, the parameters are reset before rereading, in addition to the known procedures.

Furthermore, a value minimizing an error in read-out of the data, which has been determined by the detection means, is selected for each of the parameters so as to be recorded at a specific location of the optical disk such that conditional setting in the subsequent read-out is accurately performed immediately.

By employing the above described arrangement, when conditions minimizing occurrence of the error due to detection of unerased signals of a specific component are set at the time of rereading, reliability of reproduction of the written data can be raised.

BRIEF DESCRIPTION OF THE DRAWINGS

This object and features of the present invention will become apparent from the following description taken in conjunction with the preferred embodiment thereof with reference to the accompanying drawings, in which:

FIGS. 3(a–g) and 4(a–g) are views explanatory of signals in the optical information recording and reproducing apparatus of FIG. 1;

FIGS. 7(a–g) and 8(a–g) are views explanatory of signals in the prior art reproduction signal processing circuit of FIG. 5 (already referred to);

FIG. 10b is a view showing data array of a portion of a variable parameter region in the optical disk of FIG. 10a.

Before the description of the present invention proceeds, it is to be noted that like parts are designated by like reference numerals throughout several views of the accompanying drawings.

DETAILED DESCRIPTION OF THE INVENTION

Figure 1:
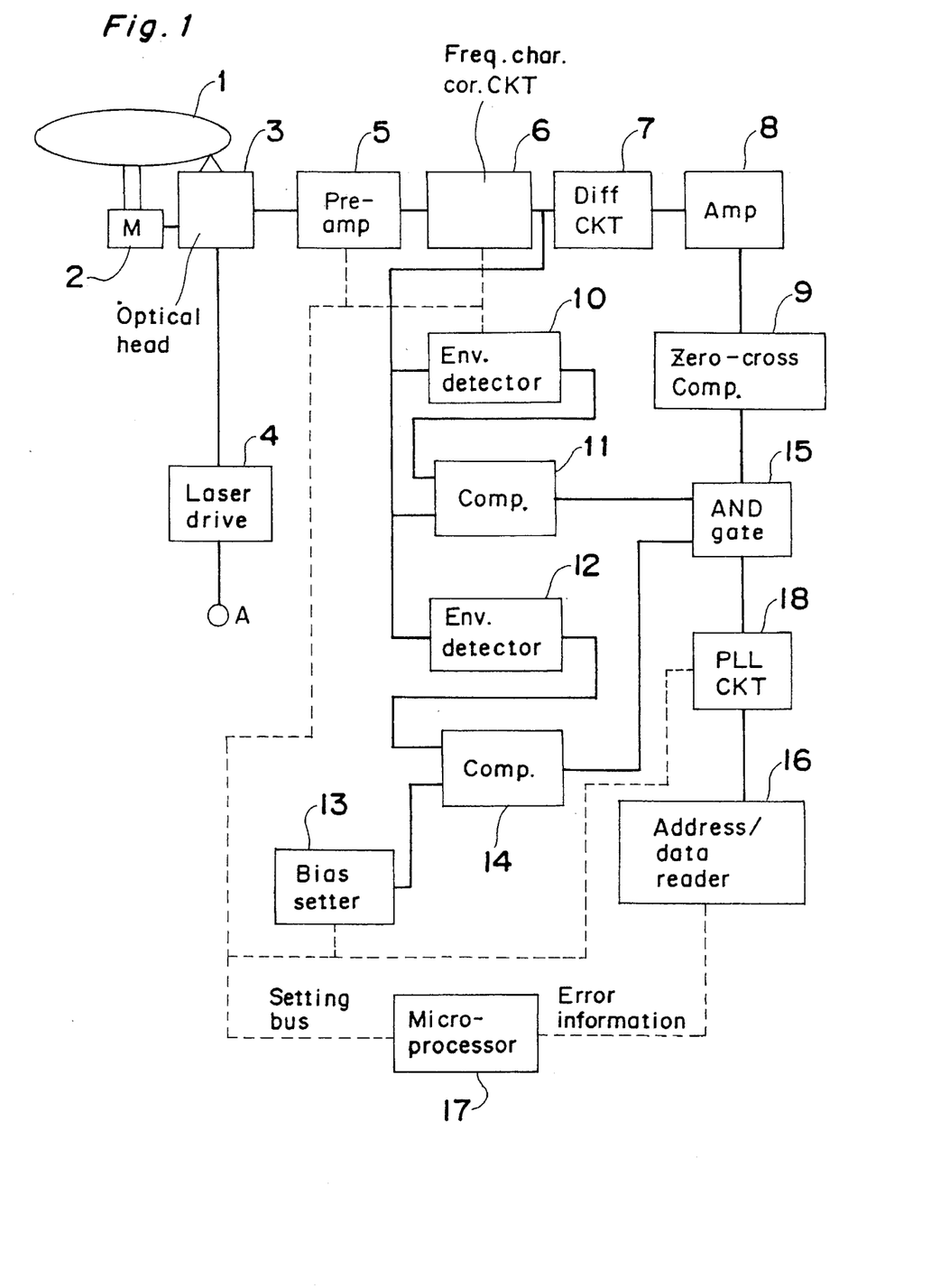
FIG. 1 is a block diagram showing a reproduction signal processing circuit employed in an optical information recording and reproducing apparatus according to one embodiment of the present invention.

Referring now to the drawings, there is shown in FIG. 1, a reproduction signal processing circuit employed in an optical information recording and reproducing apparatus according to one embodiment of the present invention. In the same manner as a prior art reproduction signal processing circuit of FIG. 5, the reproduction signal processing circuit includes an optical disk 1, a motor 2 for rotating the optical disk 1, an optical head 3 which condenses to a light beam having a diameter of about 1 μm, a laser beam emitted from a semiconductor laser or the like so as to irradiate the light beam over the optical disk 1, a laser drive circuit 4 for modulating and driving the semiconductor laser, etc. in response to a recording information signal inputted to a terminal A, a differentiating circuit 7, an amplifier 8, a zero-cross comparator 9, an AND gate 15, an address/data reading circuit 16, a second envelope detecting circuit 12 for detecting an envelope of a signal and first and second comparators 11 and 14.

The production signal processing circuit of FIG. 1 further includes a microprocessor 17 which detects read-out errors of addresses and data from the address/data reading circuit 16 and is capable of setting a plurality of variable parameters of the production signal processing circuit, a pre-amplifier 5 in which amplification degree can be variably set by the microprocessor 17, a frequency characteristics correcting circuit 6 in which characteristics of frequency correction can be variably set by the microprocessor 17, a first envelope detecting circuit 10 in which comparison level for the first comparator 11 can be variably set by the microprocessor 17, a bias setting circuit 13 for setting a bias of the second comparator 14, in which voltage level can be variably set by the microprocessor 17 and a phase locked loop (PLL) circuit 18 which fetches data synchronously with a binary data signal at fetching timing variably set by the microprocessor 17. The above mentioned microprocessor 17, pre-amplifier 5, frequency characteristics correcting circuit 6, first envelope detecting circuit 10, bias setting circuit 13 and PLL circuit 18 correspond to but are different, in function, from the microprocessor 63, the pre-amplifier 42, the frequency characteristics correcting circuit 43, the first envelope detecting circuit 44, the bias setting circuit 45 and the PLL circuit 46 of the prior art production signal processing circuit of FIG. 5, respectively.

Figure 3:
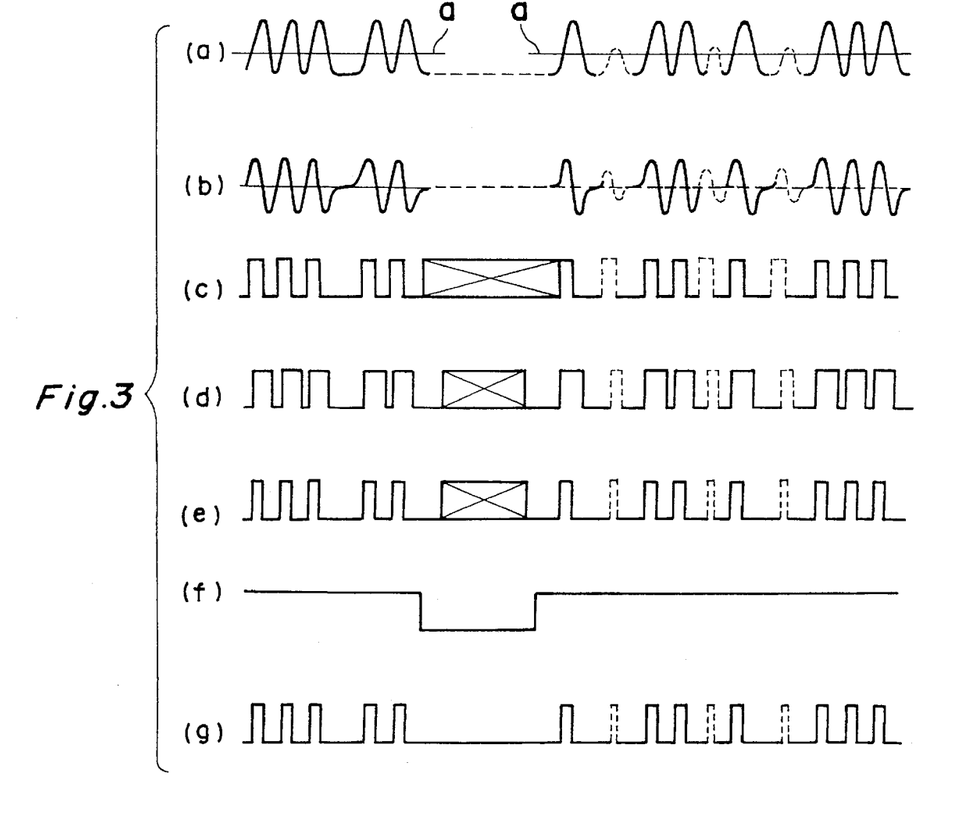
Figure 4:
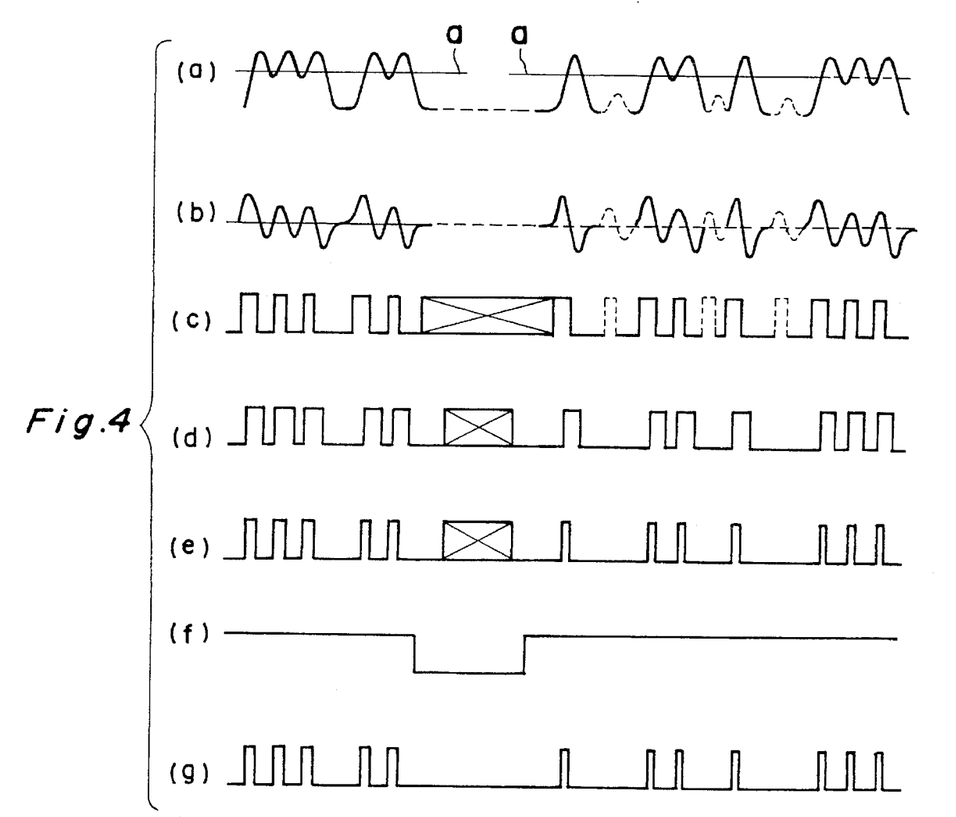

Operation of the optical information recording and reproducing apparatus of the above described arrangement is described with reference to FIGS. 3 and 4, hereinbelow. An example is given in which data in a sector having many unerased signals as shown by the broken lines in FIG. 3(a) is read out by an optical disk drive of the above described arrangement. FIG. 3(a) shows an output signal of the frequency characteristics correcting circuit 6. In a first read-out, since the parameter of the first envelope detecting circuit 10 is set to, for example, about 40% of amplitude of an input signal, the output signal of the first envelope detecting circuit 10 is obtained as shown by the portion a in FIG. 3(a) and thus, a portion of the unerased signals is detected erroneously. An output signal of the first comparator 11 is shown in FIG. 3(d), while an output signal of the differentiating circuit 7 is shown in FIG. 3(b). Since an output signal of the zero-cross comparator 9 also detects the unerased signals, an output of the AND gate 15 also detects a portion of the unerased signals. An output signal of the AND gate 15 is shown in FIG. 3(g). A data error is produced in the address/data reading circuit 16 and is detected by the microprocessor 17.

Figure 2:
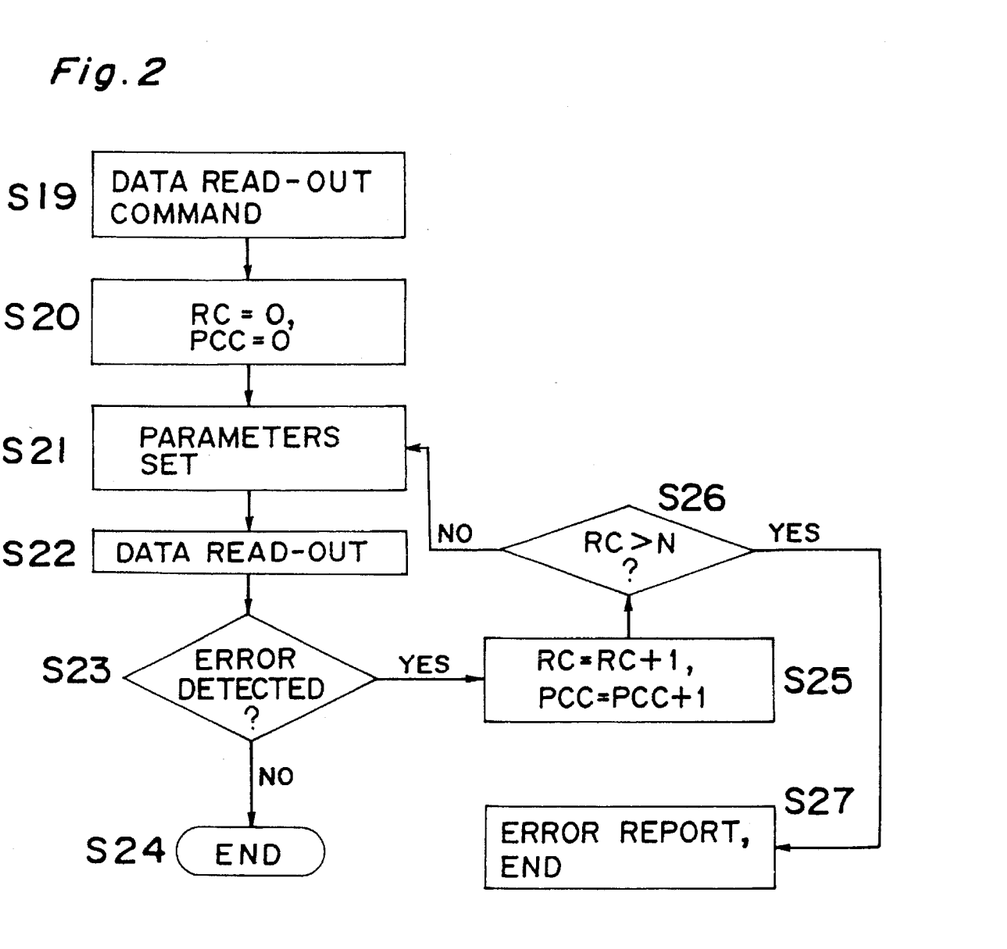
FIG. 2 is a flow chart showing processing of the optical information recording and reproducing apparatus of FIG. 1.

The microprocessor 17 which has detected the data error performs a preparation for rereading the data in accordance with a flow chart of FIG. 2. The program flow proceeds in the sequence of steps S19, S20, S21, S22, S23, S25, S26 and S21. At step S19, a data read-out command is received, while at step S20, a retry counter RC and a parameter control counter PCC are initialized. At step S21, parameters of the production signal processing circuit are set, while at step S22, data read-out is executed. At step S23, it is judged whether or not an error has been detected. At step 25, an increment is imparted to counts of the retry counter RC and the parameter control counter PCC. Meanwhile, at step S26, it is judged whether or not the count of the retry counter RC has exceeded a retry number N.

Subsequently, in a second read-out, by using the parameter control counter PCC in the flow chart of FIG. 2, the microprocessor 17 sets, for example, the parameter of the frequency characteristics correcting circuit 6 gentler by reducing lead amount of a lead compensating circuit and restricting a high-frequency component and sets the parameter of the first envelope detecting circuit 10 to, e.g., about 65% of amplitude of an input signal. At this time, an output signal of the frequency characteristics correcting circuit 6 is obtained as shown in FIG..4(a). Since the parameter of the first envelope detecting circuit 10 is set to about 65% of amplitude of the input signal, the output signal of the first envelope detecting circuit 10 is shown by the portion a in FIG. 4(a) and thus, the unerased signals are not detected. An output signal of the first comparator 11 is shown in FIG. 4(d). An output signal of the differentiating circuit 7 is obtained as shown in FIG. 4(b), so that the unerased signals are detected and thus, an output signal of the zero-cross comparator 9 also detects the unerased signals as shown in FIG. 4(c). However, since an output signal of the first comparator 11 eliminates the unerased signals, an output signal of the AND gate 15 does not detect the unerased signals finally. Therefore, the data can be read out without an error in the address/data reading circuit 16 in the sequence of steps S22, S23 and S24. The program flow ends at step S24.

In case the data cannot be read even in the second read-out, read-out of the data is further repeated by changing the above parameters. Then, when an error is detected in the read data even if reading is repeated a predetermined reading number of N times, error processing is performed.

In the foregoing, setting of the parameters of the frequency characteristics correcting circuit 6 and the first envelope detecting circuit 10 has been described. However, these parameters may also be replaced by other parameters such as gain of the pre-amplifier 5, detection level of the bias setting circuit 13 for detecting presence and absence of the data, data fetching timing obtained by offsetting phase of the PLL circuit 18 used for data reproduction.

Hereinbelow, examples of change of setting of the parameters referred to above are described. The frequency characteristics correcting circuit 6 can be formed by two or more sets of leading capacitors and resistors and an analog switch for effecting changeover among the sets. If a digital-analog converter is employed, levels of the first envelope detecting circuit 10 and the bias setting circuit 13 can be directly changed by changing data in the microprocessor 17. Alternatively, a plurality of biases may also be prepared so as to be changed over by using an analog switch. Amplification degree of the pre-amplifier 5 can be changed by employing a programmable amplifier or changing over a feedback resistance of an amplifier by an analog switch. Meanwhile, phase of the PLL circuit 18 can be changed easily by adding an output of the digital-analog converter to the phase at a fixed gain after a phase comparator in the PLL circuit 18. Since each of these procedures represents one example, it is needless to say that the parameters can be changed by employing other procedures.

Figure 9:
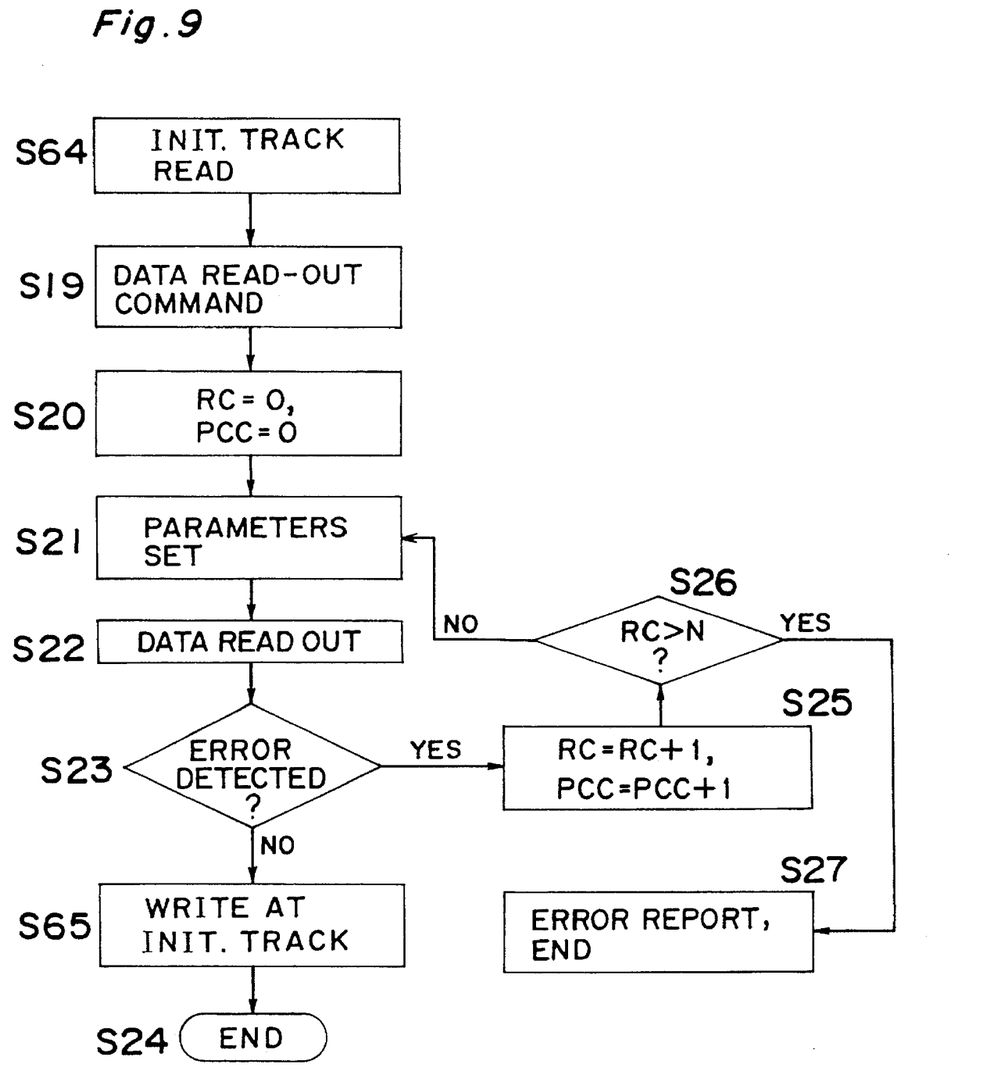
FIG. 9 is a flow chart showing another processing of the optical information recording and reproducing apparatus of FIG. 1.
Figure 10A:
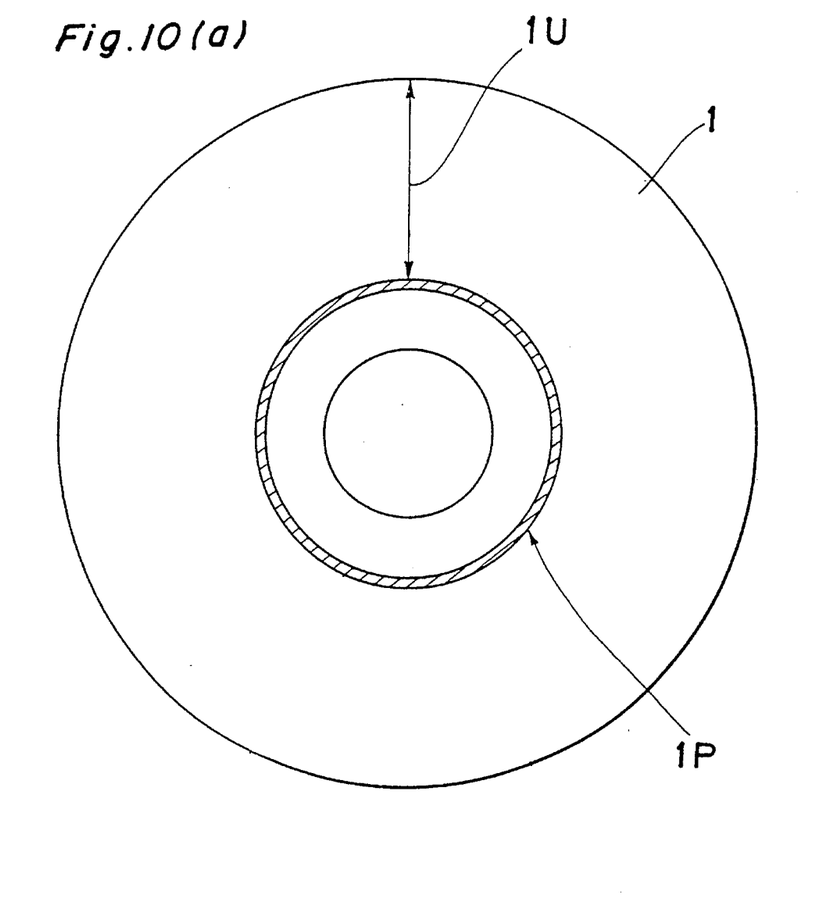
FIG. 10a is a view explanatory of data layout of an optical disk for use in the optical information recording and reproducing apparatus of FIG. 1.

Furthermore, as shown in FIG. 9, before the data read-out command is received, for example, immediately after the optical disk has been inserted into the optical disk drive, the parameters of the reproduction signal processing circuit, which are converted into predetermined codes and are set initially, may be determined by reading a track in a variable parameter region 1P (FIG. 10(a)) of the optical disk 1 and then, the data is read out. In case an error is detected in the read data, the parameters are sequentially changed in accordance with setting of the parameter control counter PCC. Conditions minimizing the errors are written at the track in the variable parameter region 1P of the optical disk 1. Thus, when the data is reproduced next time, read-out is performed on the basis of this information written at the track in the variable parameter region 1P. As a result, even in the case where read-out conditions vary due to unerasing of signals, drop-out of sensitivity of the optical disk, shape of light beam in the apparatus, etc., at least medians of the parameters associated with the optical disk can be determined immediately and thus, highly reliable data read-out conditions can be determined promptly.

Figure 10B:
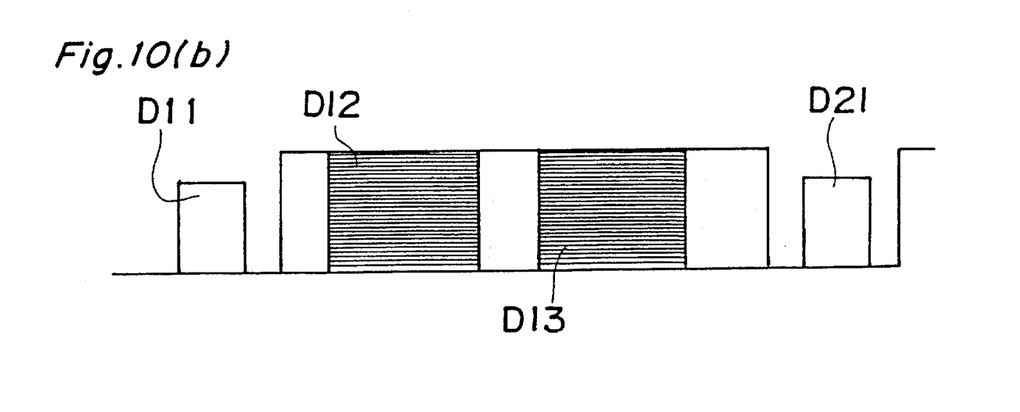

FIGS. 10(a) and 10(b) show the optical disk 1. As shown in FIG. 10(a), the optical disk 1 includes a user region 1U disposed at its radially outermost portion and the variable parameter region 1P disposed radially inwardly of the user region 1U. As shown in FIG. 10(b), the variable parameter region 1P stores addresses D11 and D21, PCC data D12 and drive identification data D13. The addresses D11 and D21 include addresses indicative of radial positions of tracks on the optical disk 1 and sector information indicative of angular positions of the tracks on the optical disk 1 and are preliminarily recorded on the optical disk 1 in embossed shape such as intermissions, etc. of the tracks. The PCC data D12 is data of the parameter control counter PCC. By reading out the PCC data D12, optimum conditions at the time of the previous reproduction can be set immediately. The PCC data D12 may be recorded in a fixed sequence for each of the parameters or information which determines combination of each of the parameters by a specific code may be recorded. The drive identification data D13 may be separate identification information for drives or may also be group identification information indicative of levels of model change, etc. When the drive identification data D13 is recorded and is used together with the PCC data D12 as necessary, the data read-out conditions can be determined more accurately and more promptly.

In the foregoing, the present invention is applied to the optical disk having many unerased signals. It has been confirmed that data errors produced in damaged or repeatedly used optical disks can be corrected by setting different parameters, respectively. Therefore, by setting parameters corresponding to the respective signal deterioration factors at the time of rereading of the data in accordance with the present invention, reliability of read-out of the data can be improved remarkably.

Meanwhile, in the above embodiment, the optical disk is described. However, as is apparent from the description given so far, since the present invention is directed to an apparatus for processing recorded signals, the present invention can also be widely applied to a device for recording and reproducing signals optically such as an optical card, an optical tape or the like and an apparatus for recording signals magnetically.

As is clear from the foregoing description, in the present invention, in case a data error is detected during or after read-out of the data from the recording medium, the data is reread a plurality of times by changing a plurality of the set parameters of the production signal processing circuit such that reliability of recording and reproduction of the data can be raised. Meanwhile, if these conditions are written at a specific location of the optical disk and read-out is performed on the basis of this written information when the data is reproduced next time, the medians of the parameters associated with the optical disk can be determined immediately and thus, highly reliable data read-out conditions can be determined promptly.

Furthermore, in the embodiment, the program flow ends at the normal end routine for the data which could be read in rereading. However, by memorizing that rereading has been performed, it may also be possible to urge the user to perform such maintenance operations as complete erasure of the optical disk and the optical disk drive or erasable optical disks.

What is claimed is:

1. An optical information recording and reproducing apparatus for use with a recording medium comprising:

the recording medium having a reproduction signal representing data;

a preamplifier for amplifying said reproduction signal from said recording medium;

a filter for compensating for said signal from said preamplifier;

a comparator for converting said signal from said filter from analog signal into binary signal;

an envelope detecting comparator having a bias circuit for detecting presence of said signal from said filter;

a phase locked loop circuit for reading out information including synchronous signals from said comparator;

a detection means for detecting errors during or after read-out of said data;

a parameter control means for controlling parameters including amplification degree of said pre-amplifier, frequency characteristics of said filter, comparison level of said comparator, bias level of said bias circuit, and data fetching timing of said phase locked loop circuit, all of the amplification degree of said pre-amplifier, the frequency characteristics of said filter, the comparison level of said comparator, the bias level of said bias circuit and the data fetching timing of said phase locked loop circuit can be changed by setting a combination of parameters; and wherein said detection means reads the data by setting a combination of initial parameters; wherein when said detection means has detected the errors, said detection means sequentially selects and sets a plurality of combinations of the parameters different from the combination of initial parameters according to said parameter control means to reread the data until the errors are not detected.

2. An optical information recording and reproducing apparatus as claimed in claim 1, wherein said detection means examines the number of errors for each of the combination of parameters so as to obtain the best combination of parameters minimizing the number of errors and the best combination of parameters minimizing the number of errors is recorded at a specific location of the recording medium.

3. An optical information recording and reproducing apparatus as claimed in claim 1 or 2, which reads out information of the combination of parameters minimizing the number of errors recorded at a specific location of the recording medium so as to initialize the combination of parameters on the basis of information.

4. The optical information recording and reproducing apparatus according to claim 1, wherein the detection means sets at least two parameters when setting the plurality of combinations of the parameters.

5. The optical information recording and reproducing apparatus according to claim 1, wherein the detection means sets at least one of the amplification degree of said pre-amplifier, the frequency characteristics of said filter, the comparison level of said comparator, and the bias level of said bias circuit, when setting the plurality of combinations of the parameters.

6. The optical information recording and reproducing apparatus according to claim 1, wherein the detection means sets at least two of the amplification degree of said pre-amplifier, the frequency characteristics of said filter, the comparison level of said comparator, the bias level of said bias circuit and the data fetching timing of said phase locked loop circuit, when setting the plurality of combinations of the parameters.

7. The optical information recording and reproducing apparatus according to claim 1, wherein the detection means sets at least three of the amplification degree of said pre-amplifier, the frequency characteristics of said filter, the comparison level of said comparator, the bias level of said bias circuit and the data fetching timing of said phase locked loop circuit, when setting the plurality of combinations of the parameters.

8. A recording medium in an optical information recording and reproducing apparatus, which has a reproduction signal representing data, the optical information recording and reproducing apparatus comprising:

a pre-amplifier for amplifying said reproduction signal from said recording medium;

a filter for compensating for said signal from said pre-amplifier;

a comparator for converting said signal from said filter from analog signal into binary signal;

an envelope detecting comparator having a bias circuit for detecting presence of said signal from said filter;

a phase locked loop circuit for reading out information including synchronous signals from said comparator;

a parameter control means for controlling parameters including amplification degree of said pre-amplifier, frequency characteristics of said filters comparison level of said comparator, bias level of said bias circuit, and data fetching timing of said phase locked loop circuit, all of the amplification degree of said pre-amplifier, the frequency characteristics of said filter, the comparison level of said comparator, the bias level of said bias circuit and the data fetching timing of said phase locked loop circuit can be changed by setting a combination of parameters; and a detection means for detecting errors during or after read-out of said data;

said detection means reads the data by setting a combination of initial parameters; wherein when said detection means has detected the errors, said detection means sequentially selects and sets a plurality of combinations of parameters different from the combination of initial parameters according to said parameter control means to reread the data until the errors are not detected;

wherein said detection means examines the number of errors for each of the combination of parameters to obtain the best combination of parameters minimizing the number of errors;

the recording medium having an area for recording the parameters such that the best combination of parameters minimizing the number of errors is recorded in the area by using a recording means of the optical information recording and reproducing apparatus.

9. An optical information recording and reproducing system comprising:

a recording medium which has a reproduction signal representing data, recording means for recording data on the recording medium;

a pre-amplifier for amplifying said reproduction signal from said recording medium;

a filter for compensating for said signal from said pre-amplifier;

a comparator for converting said signal from said filter from analog signal into binary signal;

an envelope detecting comparator having a bias circuit for detecting presence of said signal from said filter;

a phase locked loop circuit for reading out information including synchronous signals from said comparator;

a parameter control means for controlling parameters including amplification degree of said pre-amplifier, frequency characteristics of said filter, comparison level of said comparator, bias level of said bias circuit, and data fetching timing of said phase locked loop circuit, all of the amplification degree of said pre-amplifier, the frequency characteristics of said filter, the comparison level of said comparator, the bias level of said bias circuit and the data fetching timing of said phase locked loop circuit can be changed by setting a combination of parameters;

a detection means for detecting errors during or after read-out of said data;

wherein said detection means reads the data by setting a combination of initial parameters; wherein when said detection means has detected the errors, said detection means sequentially selects and sets a plurality of combinations of parameters different from the combination of initial parameters according to said parameter control means so as to reread the data until the errors are not detected;

wherein said detection means examines the number of errors for each of the combination of parameters so as to obtain the best combination of parameters minimizing the number of errors;

said recording medium further having an area for recording the parameters such that the best combination of parameters minimizing the number of errors is recorded in the area by the recording means of the optical information recording and reproducing apparatus.

10. An optical information recording and reproducing apparatus for use with a recording medium comprising:

the recording medium having a reproduction signal representing data;

a preamplifier for amplifying said reproduction signal from said recording medium;

a filter for compensating for said signal from said pre-amplifier;

a comparator for converting said signal from said filter from analog signal into binary signal;

an envelope detecting comparator having a bias circuit for detecting presence of said signal from said filter;

a phase locked loop circuit for reading out information including synchronous signals from said comparator;

a parameter control means for controlling parameters including amplification degree of said pre-amplifier, frequency characteristics of said filter, comparison level of said comparator, bias level of said bias circuit and data fetching timing of said phase locked loop circuit as combinations, said parameter control means further for setting at least two of the amplification degree of said pre-amplifier, the frequency characteristics of said filter, the comparison level of said comparator, the bias level of said bias circuit and the data fetching timing of said phase locked loop circuit by setting the parameters;

a detection means for detecting errors during or after read-out of said data;

wherein in case said detection means has detected the errors, said detection means changes the parameter or combination of parameters so as to reread the data.

* * * * *

UNITED STATES PATENT AND TRADEMARK OFFICE
CERTIFICATE OF CORRECTION

PATENT NO. : 5,600,616
DATED : February 4, 1997
INVENTOR(S) : Inokuchi et al.

It is certified that error appears in the above-indentified patent and that said Letters Patent is hereby corrected as shown below:

In column 9, line 42, "filters" should be --filter,--.

Signed and Sealed this

Seventeenth Day of June, 1997

Attest:

BRUCE LEHMAN

*Attesting Officer*   *Commissioner of Patents and Trademarks*